United States Patent [19]
Yamamoto

[11] Patent Number: 5,999,246
[45] Date of Patent: Dec. 7, 1999

[54] IMAGE RECORDING APPARATUS WITH IMPROVED SPATIAL LIGHT MODULATOR

[75] Inventor: Ryoichi Yamamoto, Kanagawa-ken, Japan

[73] Assignee: Fuji Photo Film Co., Ltd., Kanagawa-ken, Japan

[21] Appl. No.: 09/064,103

[22] Filed: Apr. 22, 1998

[30] Foreign Application Priority Data

Apr. 22, 1997 [JP] Japan ................................ 9-104446

[51] Int. Cl.$^6$ .................................................. G03B 27/70
[52] U.S. Cl. ............................ 355/66; 355/66; 355/32; 355/20; 348/743
[58] Field of Search ................................ 355/20, 66, 32; 348/743

[56] References Cited

U.S. PATENT DOCUMENTS 5,619,059  4/1997  Li et al. .................................. 257/431
5,805,274  9/1998  Saita ........................................ 355/66

*Primary Examiner*—Eddie C. Lee
*Assistant Examiner*—Emily C. Jones
*Attorney, Agent, or Firm*—Sughrue, Mion, Zinn, Macpeak & Seas, PLLC

[57] ABSTRACT

A color image is recorded on a color photosensitive material by using a spatial light modulator, which comprises a photoconductive layer and an electro-optic material layer located with an insulating multi-layer film mirror intervening therebetween. An optical pattern is inputted from the side of the photoconductive layer and written into the spatial light modulator. Reading light is irradiated from the side of the electro-optic material layer and reflected from the multi-layer film mirror, and the written optical pattern is thereby read from the spatial light modulator. The multi-layer film mirror has spectral reflectance characteristics such that the reflectance with respect to the reading light having wavelengths falling within a wavelength range, for which the sensitivity of the color photosensitive material is high, may be lower than the reflectance with respect to the reading light having wavelengths falling within a wavelength range, for which the sensitivity of the color photosensitive material is low.

9 Claims, 10 Drawing Sheets

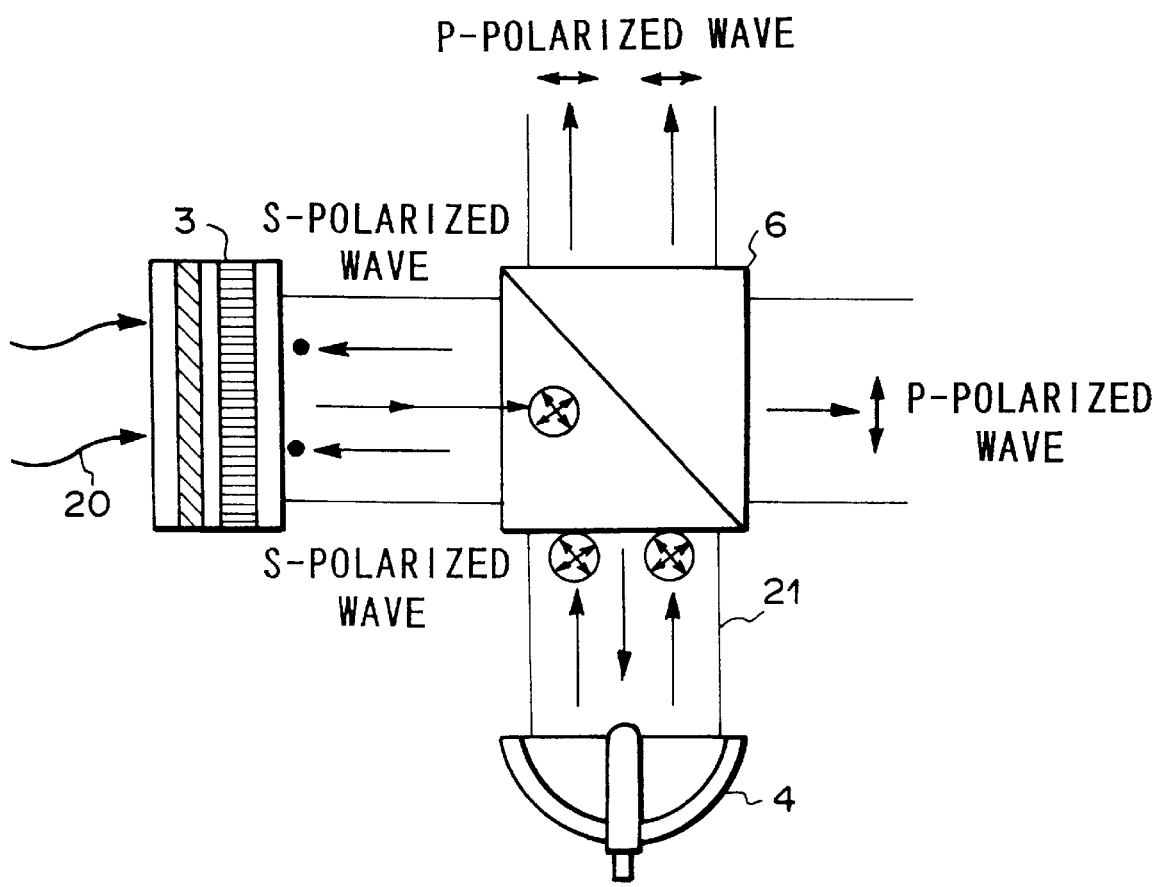

NO WRITING LIGHT

WITH WRITING LIGHT

IMAGE RECORDING APPARATUS WITH IMPROVED SPATIAL LIGHT MODULATOR

BACKGROUND OF THE INVENTION

1. Field of the Invention

This invention relates to an image recording apparatus for irradiating an optical pattern to a photosensitive material, such as photographic paper, and thereby recording an image, which is represented by the optical pattern, on the photosensitive material. This invention particularly relates to an image recording apparatus for recording a color image by use of a spatial light modulator.

2. Description of the Prior Art

There have heretofore been carried out operations for irradiating light to a photosensitive material, such as photographic paper or a heat development photosensitive material, developing the thus exposed photosensitive material, and thereby obtaining the optical pattern as a visible image. As the techniques for irradiating the optical pattern to the photosensitive material, various techniques have heretofore been carried out. For example, with techniques using ordinary enlarging apparatuses or printers, light having passed through a negative film is projected onto photographic paper. With different techniques, an image signal, which has been obtained by photoelectrically reading out an image recorded on a negative film, is fed into a cathode ray tube (CRT) display device, and light radiated out from the CRT display device is directly irradiated to a photosensitive material. With further different techniques, a laser beam is modulated with an image signal, and the thus modulated laser beam is scanned on a photosensitive material.

Ordinarily, the sensitivity of photosensitive materials is not very high. Therefore, in cases where the aforesaid techniques using the CRT display device is employed, it is necessary for the luminance of the CRT display device to be set at a high level. However, if the luminance of the CRT display device is set at a high level, the spot diameter of the CRT display device will become large, and therefore the resolution of the image recorded on the photosensitive material cannot be kept high. Also, in order for the image to be recorded on the photosensitive material such that the resolution may be kept high, it is necessary for the irradiation of the optical pattern from the CRT display device to be carried out for a long time.

With the techniques wherein a laser beam is irradiated to the photosensitive material, the laser beam is quickly scanned on the photosensitive material and therefore a certain point on the photosensitive material is exposed to light only for a very short time. As a result, the problems occur with regard to a reciprocity law failure occur, in which the exposure amount necessary for yielding a specific level of image density varies in accordance with the conditions of the illuminance of light and the irradiation time. Accordingly, it is necessary for a specific photosensitive material free from the reciprocity law failure to be used, and general-purpose photosensitive materials cannot be used.

In view of the above circumstances, the applicant proposed an image recording apparatus, with which an image of a high resolution can be recorded quickly on a general-purpose photosensitive material, and a method of using the image recording apparatus. The image recording apparatus and the method of using it are disclosed in Japanese Unexamined Patent Publication No. 7(1995)-270746.

One image recording apparatus disclosed in Japanese Unexamined Patent Publication No. 7(1995)-270746 substantially comprises:

i) a single spatial light modulator, which comprises a photoconductive layer and an electro-optic material layer located with a light reflecting layer intervening therebetween, the spatial light modulator operating such that an optical pattern may be optically inputted from the side of the photoconductive layer into the spatial light modulator, and the optical pattern may thereby be written into the spatial light modulator, and such that reading light may be irradiated from the side of the electro-optic material layer to the spatial light modulator and may be reflected from the light reflecting layer, and the optical pattern, which has been written into the spatial light modulator, may thereby be read from the spatial light modulator, ii) an optical pattern input means, which inputs blue (B), green (G), and red (R) optical patterns into the spatial light modulator, and iii) an optical pattern reading means comprising:

a) a light source for irradiating B reading light, G reading light, and R reading light to the spatial light modulator in synchronization with the inputting of the B, G, and R optical patterns, respectively, and b) an optical system for irradiating the optical patterns, which have been read from the spatial light modulator, to a color photosensitive material, the image recording apparatus recording a color image, which is represented by the optical patterns, on the color photosensitive material.

As the electro-optic material layer, which constitutes the spatial light modulator described above, a liquid crystal layer having an operation mode, such as an electrically controlled birefringence (ECB) mode, is used popularly.

A technique, wherein a dielectric multi-layer film mirror, which is made up of 15 layers constituted of ZnS and $MgF_2$, is used as a light reflecting layer, which is located between a photoconductive layer and an electro-optic material layer in a spatial light modulator of the type described above, is disclosed in, for example, Applied Physics Letters, Vol. 22, No. 3, 1973, pp. 90–92.

Also, a spatial light modulator, wherein a specific light reflecting layer is employed, the resistance of the light reflecting layer along its intra-surface direction is thereby kept to be large, and the resolution is enhanced, is disclosed in, for example, Japanese Unexamined Patent Publication No. 3(1991)-107818. In the disclosed spatial light modulator, the light reflecting layer is constituted of an $Si-Ge/SiO_2$ alternate multi-layer film, in lieu of an $SiO_2/Si$ alternate multi-layer film mirror and a $TiO_2/SiO_2$ alternate multi-layer film mirror.

Further, a spatial light modulator, wherein a light reflecting layer is constituted of an alternate multi-layer film mirror, which comprises $SiO_2$ films and Si or Ge light absorbing films located alternately, is disclosed in, for example, Japanese Unexamined Patent Publication No. 3(1991)-217825. By the use of the alternate multi-layer film mirror as the light reflecting layer, the mirror layer is imparted with the functions for a light blocking layer. In this manner, voltage loss in the mirror layer and a light blocking layer is reduced, spread of the line of electric force is reduced, and the contrast ratio and the resolution are enhanced.

With the spatial light modulators described above, as described also in Japanese Unexamined Patent Publication No. 3(1991)-107818, if the electrical conductivities of the light reflecting layer and a light blocking layer, which is located together with the light reflecting layer, along their intra-surface directions are high, a good image cannot be obtained. Therefore, in cases where the light reflecting layer and the light blocking layer are made from a material having a high electrical conductivity, such as a metal, the light reflecting layer and/or the light blocking layer is subjected to patterning with respect to picture elements, and the picture elements are thereby insulated from one another. Alternatively, as disclosed also in Japanese Unexamined Patent Publication No. 3(1991)-107818, a countermeasure is taken in order to reduce the electrical conductivity as much as possible.

In view of the above circumstances, the light reflecting layer is often constituted of a dielectric multi-layer film mirror having the electrical insulating properties. Ordinarily, in cases where the light reflecting layer is constituted of an electrical insulating material, an electric field, which acts upon the electro-optic material layer in order to form an image, spreads in the transverse direction as it passes through the layers having the electrical insulating properties, such as the light reflecting layer, the light blocking layer, and the electro-optic material layer. Therefore, as the thicknesses of the layers having the electrical insulating properties become large, the resolution becomes low.

Also, in particular, in the spatial light modulator of the type in which an optical pattern is inputted optically, since voltage loss arises due to the layers having the electrical insulating properties described above, the problems described below occur. Specifically, as the electric capacities of the layers having the electrical insulating properties become small (i.e., as the layer thicknesses of the layers having the electrical insulating properties become large), the amount of modulation of the electric field, which is applied to the electro-optic material layer, becomes small, and the sensitivity becomes low.

Accordingly, it is required that the layer thickness of the light reflecting layer in the spatial light modulator be kept as thin as possible.

Further, in cases where the spatial light modulator is utilized in the aforesaid color image recording apparatuses, color video projectors, or the like, such that the light utilization efficiency may be kept high, the absolute reflectance of the light reflecting layer should preferably be as high as possible. Also, such that no tinting may occur with respect to the entire range of the visible wavelength region, the spectral reflectance of the light reflecting layer should preferably be as flat as possible.

As the dielectric multi-layer film mirror which constitutes the light reflecting layer, a mirror constituted of a multi-layer film comprising repeated quarter-wave layers with respect to a single center wavelength has heretofore been known widely. Ordinarily, such a dielectric multi-layer film mirror is not provided with an effect range capable of covering the entire range of the visible wavelength region. Therefore, a plurality of dielectric multi-layer film mirrors with respect to two or more center wavelengths must be combined together. However, in such cases, the total thickness of the combined mirrors cannot be kept small, and the resolution and the sensitivity cannot be kept high.

SUMMARY OF THE INVENTION

The primary object of the present invention is to provide an image recording apparatus, wherein the film thickness of a multi-layer film mirror constituting a light reflecting layer of a spatial light modulator is kept small, and the resolution and the sensitivity are thereby kept high.

The present invention provides an image recording apparatus comprising:

i) a single spatial light modulator, which comprises a photoconductive layer and an electro-optic material layer located with a multi-layer film mirror intervening therebetween, the multi-layer film mirror having electrical insulating properties, the spatial light modulator operating such that an optical pattern may be optically inputted from the side of the photoconductive layer into the spatial light modulator, and the optical pattern may thereby be written into the spatial light modulator, and such that reading light may be irradiated from the side of the electro-optic material layer to the spatial light modulator and may be reflected from the multi-layer film mirror, and the optical pattern, which has been written into the spatial light modulator, may thereby be read from the spatial light modulator, ii) an optical pattern input means, which inputs blue (B), green (G), and red (R) optical patterns into the spatial light modulator, and iii) an optical pattern reading means comprising:
   a) a light source for irradiating B reading light, G reading light, and R reading light to the spatial light modulator in synchronization with the inputting of the B, G, and R optical patterns, respectively, and
   b) an optical system for irradiating the optical patterns, which have been read from the spatial light modulator, to a color photosensitive material, the image recording apparatus recording a color image, which is represented by the optical patterns, on the color photosensitive material, wherein the improvement comprises employing, as the multi-layer film mirror of the spatial light modulator, a multi-layer film mirror having spectral reflectance characteristics such that the reflectance with respect to the reading light having wavelengths falling within a wavelength range, for which the sensitivity of the color photosensitive material is high, may be lower than the reflectance with respect to the reading light having wavelengths falling within a wavelength range, for which the sensitivity of the color photosensitive material is low.

In the image recording apparatus in accordance with the present invention, specifically, the color photosensitive material may have the characteristics such that the sensitivity SB with respect to the B reading light, the sensitivity SG with respect to the G reading light, and the sensitivity SR with respect to the R reading light may have a relationship represented by the formula SB>SG>SR, and the multi-layer film mirror may have the characteristics such that the reflectance RB with respect to the B reading light, the reflectance RG with respect to the G reading light, and the reflectance RR with respect to the R reading light may have a relationship represented by the formula RB<RG<RR.

Also, in particular, in cases where the B reading light has wavelengths falling within a wavelength range of 460 nm to 500 nm, the G reading light has wavelengths falling within a wavelength range of 540 nm to 580 nm, and the R reading light has wavelengths falling within a wavelength range of 630 nm to 750 nm, with a mean value of the reflectance RR with respect to the R reading light being taken as 100, a mean value of the reflectance RB with respect to the B reading light should preferably fall within the range of $5 \leq RB < 30$, and a mean value of the reflectance RG with respect to the G reading light should preferably fall within the range of $30 \leq RG \leq 70$.

Further, the multi-layer film mirror should preferably be made from a multi-layer film selected from the group consisting of a multi-layer film constituted of a dielectric substance having electrical insulating properties, and a multi-layer film constituted of a plurality of dielectric substances having electrical insulating properties. Specifically, the multi-layer film mirror may be made from a multi-layer film constituted of a material selected from the group consisting of silicon oxide, titanium oxide, hafnium oxide, tantalum oxide, magnesium fluoride, lithium fluoride, zinc sulfide, a mixture of at least two of the above-enumerated compounds, a combination of at least two of the above-enumerated compounds, a combination of at least two of the mixtures, and a combination of at least one of the above-enumerated compounds and at least one of the mixtures.

The thickness of the multi-layer film mirror should preferably be at most 3 $\mu$m.

The effects of the image recording apparatus in accordance with the present invention will be described hereinbelow.

As is well known, in order for a multi-layer film mirror, such as a dielectric multi-layer film mirror, to have flat spectral reflectance characteristics, the number of the layers must inevitably be increased, and therefore the thickness of the multi-layer film mirror becomes large.

On the other hand, the multi-layer film mirror having the non-flat spectral reflectance characteristics such that the reflectance with respect to the reading light having wavelengths falling within a wavelength range, for which the sensitivity of the color photosensitive material is high, may be lower than the reflectance with respect to the reading light having wavelengths falling within a wavelength range, for which the sensitivity of the color photosensitive material is low, can be formed such that the number of the layers may be comparatively small. Therefore, the thickness of the multi-layer film mirror having the non-flat spectral reflectance characteristics can be kept smaller than that of a mirror made up of a large number of layers. With the spatial light modulator provided with the multi-layer film mirror having a small thickness as the light reflecting layer, the spread of the line of electric force becomes small, and the resolution can be kept high. Also, the voltage loss becomes small, and the degree of modulation of the voltage, which is applied across the electro-optic material layer, such as a liquid crystal layer, becomes large. Accordingly, the image recording apparatus in accordance with the present invention, which is provided with such a spatial light modulator, has a high resolution and a high sensitivity.

Further, in cases where the multi-layer film mirror having the non-flat spectral reflectance characteristics described above is used, the spectral sensitivity characteristics of the color photosensitive material can be compensated for by the spectral reflectance characteristics. Therefore, in cases where white light is passed through a color filter and used as the recording light, the efficiency, with which the recording light is utilized, can be kept high.

BRIEF DESCRIPTION OF THE DRAWINGS

FIG. 3 is an explanatory view showing how reading light is modulated.

DESCRIPTION OF THE PREFERRED EMBODIMENTS

The present invention will hereinbelow be described in further detail with reference to the accompanying drawings.

Figure 1:
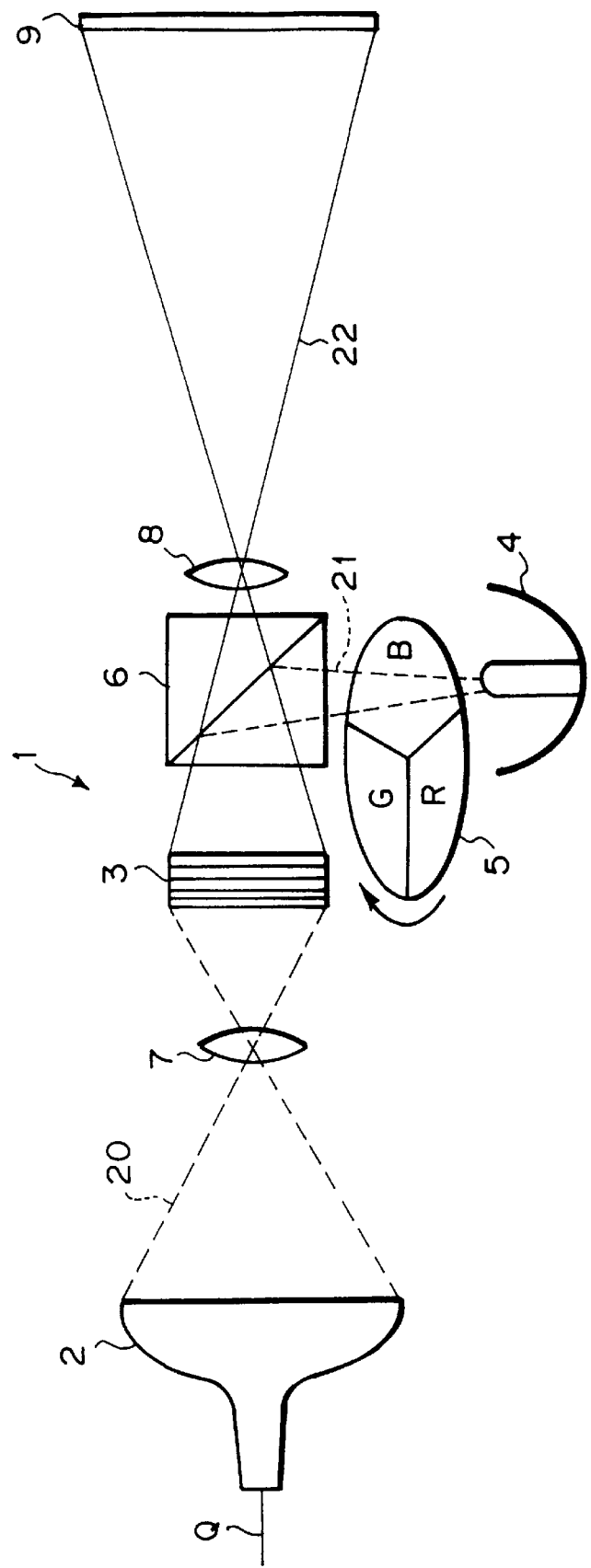
FIG. 1 is a schematic side view showing an embodiment of the image recording apparatus in accordance with the present invention.

FIG. 1 is a schematic side view showing an embodiment of the image recording apparatus in accordance with the present invention. With reference to FIG. 1, an image recording apparatus 1 comprises a CRT display device 2 for projecting an optical pattern, and a spatial light modulator 3. The optical pattern, which has been projected by the CRT display device 2, is written into the spatial light modulator 3 from its one surface side. Also, light is irradiated to the spatial light modulator 3 from the other surface side, and the optical pattern, which has been written into the spatial light modulator 3, is thereby read from the spatial light modulator 3. The image recording apparatus 1 also comprises a halogen lamp 4 for producing the reading light and irradiating it to the spatial light modulator 3, and a filter 5 for selectively transmitting blue (B) light, green (G) light, or red (R) light, which constitutes the reading light having been produced by the halogen lamp 4. The image recording apparatus 1 further comprises a polarization beam splitter (PBS) 6 for causing the light, which has passed through the filter 5, to impinge upon the spatial light modulator 3. The image recording apparatus 1 still further comprises a writing lens 7 for causing the optical pattern, which has been radiated out from the CRT display device 2, to impinge upon the spatial light modulator 3, and a projecting lens 8 for projecting the optical pattern, which has been read from the spatial light modulator 3, onto a color photosensitive material 9.

Figure 2:
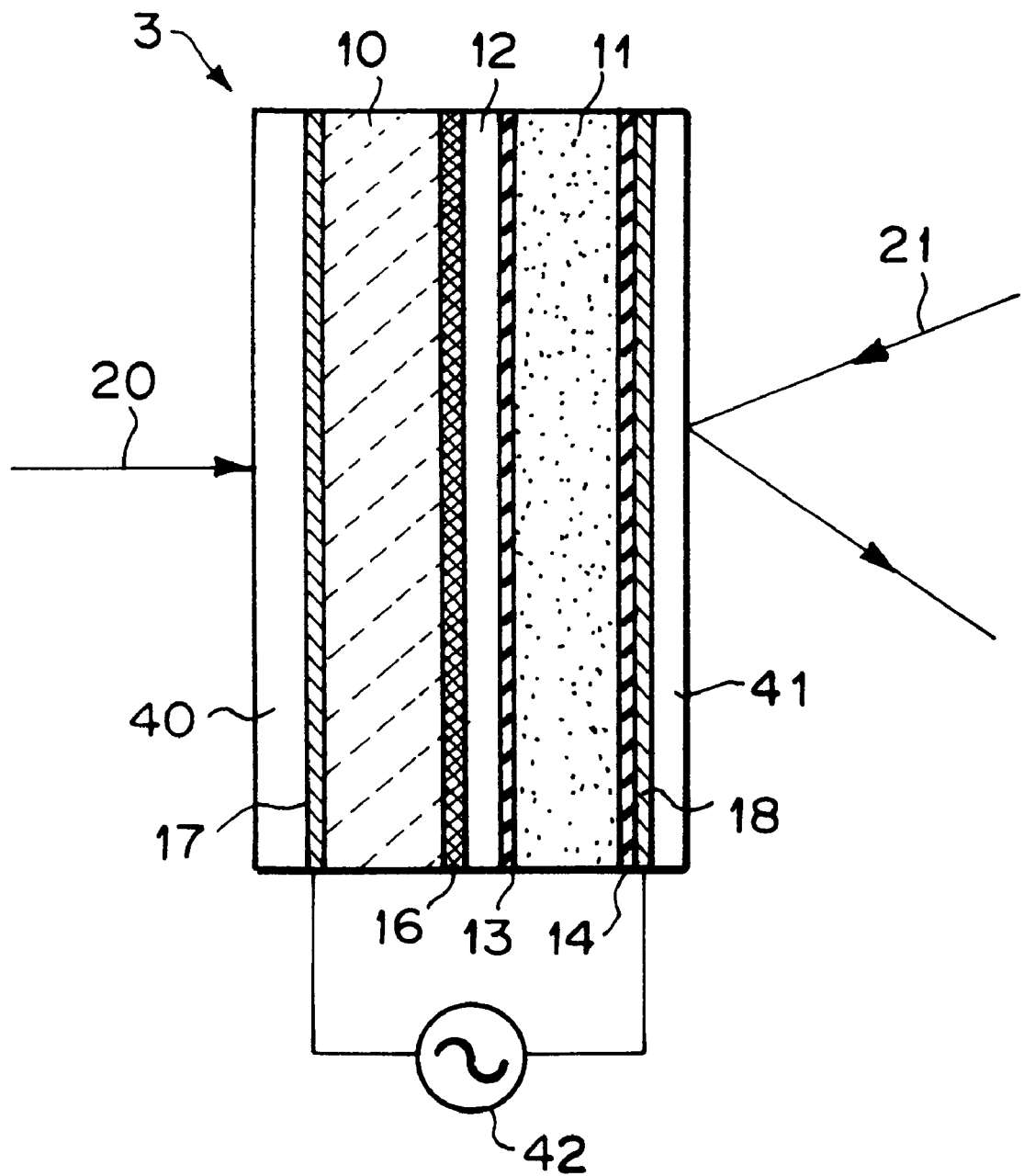
FIG. 2 is a schematic side view showing a spatial light modulator, which is employed in the image recording apparatus of FIG. 1.

The spatial light modulator 3 will be described hereinbelow with reference to FIG. 2. As illustrated in FIG. 2, the spatial light modulator 3 comprises a photoconductive layer 10, which undergoes a change in impedance when it is exposed to light, and a liquid crystal layer 11, which is located in close vicinity to and in parallel with the photoconductive layer 10. The spatial light modulator 3 also comprises a dielectric mirror 12, which is formed in a layer form between the photoconductive layer 10 and the liquid crystal layer 11. The dielectric mirror 12 reflects reading light 21, which has passed through the liquid crystal layer 11 and then impinges upon the dielectric mirror 12. Orientation films 13 and 14 are located on opposite sides of the liquid crystal layer 11.

A light absorbing layer (i.e., a light blocking film) 16 for blocking the reading light 21 is located between the photoconductive layer 10 and the dielectric mirror 12. Also, a transparent electrode 17 is located on the outward side of the photoconductive layer 10, and a transparent electrode 18 is located on the outward side of the orientation film 14.

The combination of the aforesaid constitution elements 10 through 18 is sandwiched between a pair of glass substrates 40 and 41, which have a low coefficient of thermal expansion. An electric power source 42, which applies an AC bias voltage across the photoconductive layer 10 and the liquid crystal layer 11, is connected to the transparent electrodes 17 and 18.

By way of example, the photoconductive layer 10 is constituted of amorphous silicon (a-Si) and has a thickness of 10 μm. The liquid crystal layer 11 is constituted of a liquid crystal, which has a negative dielectric anisotropy A, and undergoes tilted homeotropic orientation. The liquid crystal layer 11 has a thickness of, for example, 6 μm and operates in the ECB mode. The dielectric mirror 12 is a multi-layer film mirror comprising $SiO_2$ films and $TiO_2$ films, which are formed alternately. The thickness of the dielectric mirror 12 is 1.2 μm.

Each of the orientation films 13 and 14 is constituted of an SiO vacuum deposited film and has a thickness of 40 nm. The light absorbing layer 16 is made from an ultraviolet-curing resin containing carbon dispersed therein and has a thickness of 2 μm. Each of the transparent electrodes 17 and 18 is an ITO solid electrode and has a thickness of 0.1 μm.

The spatial light modulator 3 may be produced in the manner described below. Firstly, the transparent electrode 17 constituted of an ITO film is formed on one surface of the glass substrate 40, and the transparent electrode 18 constituted of an ITO film is formed on one surface of the glass substrate 41. Thereafter, an a-Si film is formed with a chemical vapor deposition (CVD) process on the transparent electrode 17, which has been formed on the glass substrate 40, and the photoconductive layer 10 is thereby formed. An ultraviolet-curing resin containing carbon dispersed therein is then applied onto the photoconductive layer 10 and cured with the irradiation of ultraviolet rays, and the light absorbing layer 16 is thereby formed.

Thereafter, the dielectric mirror 12 is formed on the light absorbing layer 16. Specifically, $TiO_2$ films and $SiO_2$ films, which respectively have optimized thicknesses falling within the range of 10 nm to 140 nm, are formed alternately, and a total of 15 layers are thereby overlaid one upon another.

Figure 5:
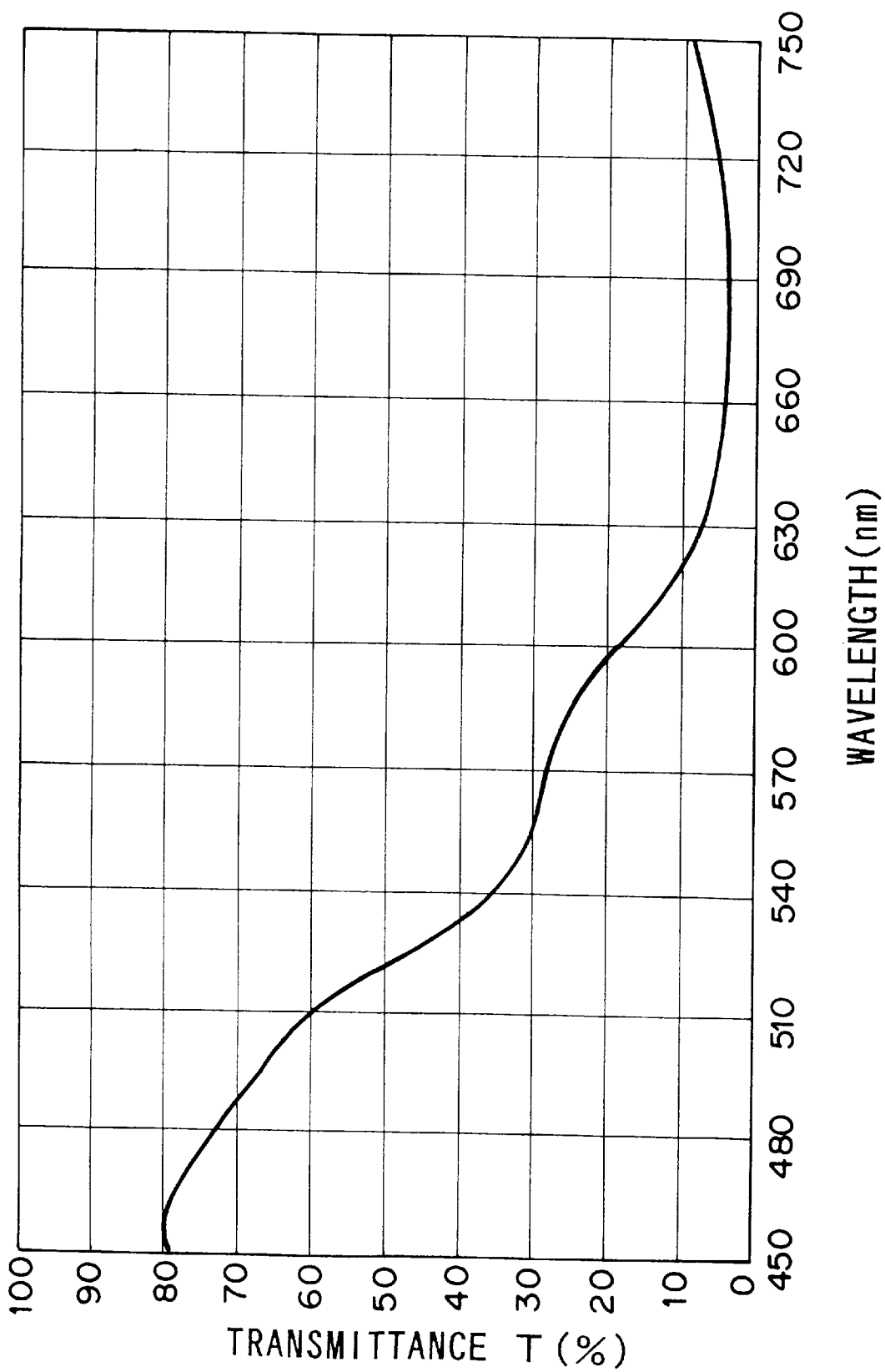
FIG. 5 is a graph showing the spectral transmittance characteristics of a dielectric mirror in the spatial light modulator of FIG. 2.
Figure 8:
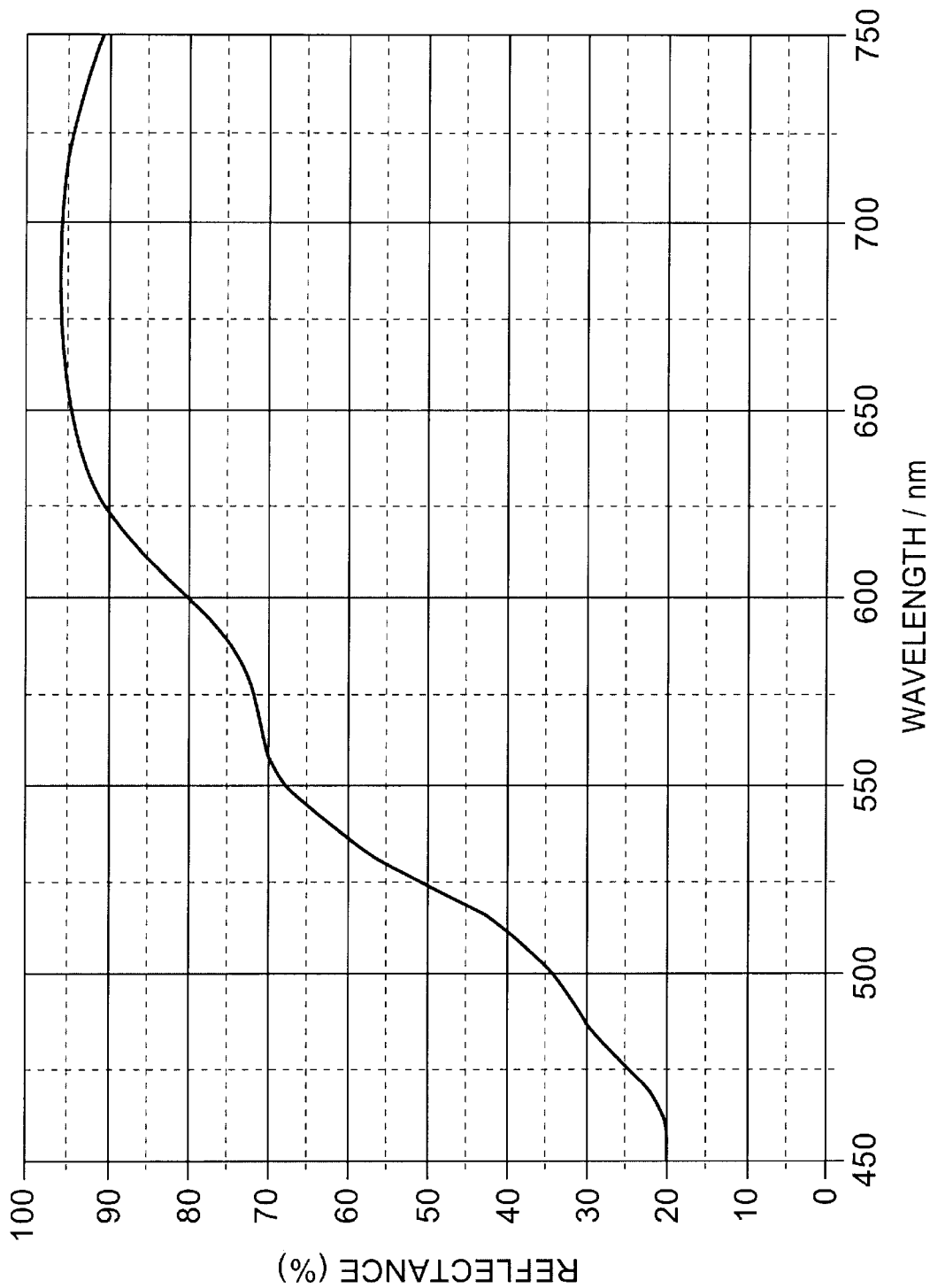
FIG. 8 is a graph showing the reflectance of the conductive multi-layer film mirror of the present invention.

FIG. 5 shows the spectral transmittance characteristics of the dielectric mirror 12. In FIG. 5, as an aid in facilitating the measurement, the transmittance T (%) is illustrated. Substantially, the reflectance R(%) is approximately represented by the formula R=100−T, as illustrated in FIG. 8. As is found from FIGS. 5 and 8, the dielectric mirror 12 employed in this embodiment has the characteristics such that the mean reflectance RB with respect to the blue (B) light, which has wavelengths falling within a wavelength range of 460 nm to 500 nm, may be equal to approximately 20%, the mean reflectance RG with respect to the green (G) light, which has wavelengths falling within a wavelength range of 540 nm to 580 nm, may be equal to approximately 60%, and the mean reflectance RR with respect to the red (R) light, which has wavelengths falling within a wavelength range of 630 nm to 750 nm, may be equal to approximately 90%. Specifically, RB<RG<RR. Also, with RR being taken as 100, RB is equal to approximately 18, and RG is equal to approximately 54.

It is not necessary for the dielectric mirror 12 to have flat spectral reflectance characteristics, the thickness of the dielectric mirror 12 can be set to be as thin as 1.2 μm.

Thereafter, an SiO film is deposited with an oblique-incidence vacuum evaporation process on the dielectric mirror 12, which has been formed on the glass substrate 40, and the orientation film 13 is thereby formed. The deposition is carried out in a direction, which is normal to the direction of deposition of the dielectric mirror 12. In the same manner as that described above, an SiO film is deposited with the oblique-incidence vacuum evaporation process on the transparent electrode 18, which has been formed on the glass substrate 41, and the orientation film 14 is thereby formed.

The glass substrates 40 and 41 are then combined together, such that the orientation films 13 and 14 may stand facing each other, and such that the directions of deposition of the orientation films 13 and 14 may be anti-parallel with each other. Also, an epoxy adhesive agent, which contains 6 μ-diameter silica beads kneaded therein as a spacer, is applied only to the side outward from the optical effective region, and the orientation film sides of the glass substrates 40 and 41 are thereby adhered to each other. At this time, the orientation film sides of the glass substrates 40 and 41 stand facing each other at a spacing of approximately 6 μm. A cell is obtained in this manner. An ECB operation mode liquid crystal (N-35 supplied by Chisso Corp.) is injected in a vacuum into the thus formed cell, and the injection opening is then sealed with the epoxy adhesive agent. In this manner, the spatial light modulator 3 shown in FIG. 2 is obtained.

With the spatial light modulator 3 having the constitution described above, when an optical pattern 20 is irradiated to the photoconductive layer 10, the impedance of the exposed portion of the photoconductive layer 10 becomes low. Also, the voltage across the portion of the liquid crystal layer 11, which portion corresponds to the exposed portion of the photoconductive layer 10, becomes high, and the liquid crystal molecule arrangement at the portion of the liquid crystal layer 11 changes. Thereafter, the reading light 21, which is linearly polarized light, is irradiated such that it may pass through the liquid crystal layer 11 and is then reflected from the dielectric mirror 12. As a result, the reflected reading light 21 is modulated in accordance with the change in liquid crystal molecule arrangement. Therefore, the optical pattern 20 can be displayed by detecting the reading light 21.

As the spatial light modulator 3, by way of example, a device for ILA, which is employed in a liquid crystal projector ILA-M315G (supplied by Victor Company of Japan Ltd.), can be utilized appropriately. Details of such a spatial light modulator are described in, for example, "Rapidly Advancing Liquid Crystal Projector: ILA™," Tadayoshi Miyoshi, O plus E, No. 165, pp. 71–76, August 1993.

How the image recording apparatus 1 operates will be described hereinbelow. Firstly, as illustrated in FIG. 1, an image signal Q is fed into the CRT display device 2, and the optical pattern 20, which carries the image information represented by the image signal Q, is projected from the CRT display device 2. In this embodiment, in order for color printing to be carried out, firstly, a signal representing the B image is fed into the CRT display device 2, and the optical pattern 20 representing the B image is projected from the CRT display device 2. At this time, the luminance of the CRT display device 2 is set to be low, and the beam diameter of the CRT display device 2 is set to be small. The resolution of the optical pattern 20, which is written into the spatial light modulator 3, is thereby kept high. The optical pattern 20, which has been projected from the CRT display device 2, passes through the writing lens 7 and then impinges upon the surface on the writing side (i.e., the side of the photoconductive layer 10) of the spatial light modulator 3. The optical pattern 20, which thus impinges upon the spatial light modulator 3, is written into the spatial light modulator 3.

After the optical pattern 20 has been written into the spatial light modulator 3, the reading light 21 is radiated out from the halogen lamp 4. The reading light 21 passes through a B filter 5 and impinges upon the PBS 6. The reading light 21 is reflected by the PBS 6 and impinges upon the surface on the reading side (i.e., the side of the liquid crystal layer 11) of the spatial light modulator 3. As described above, the reading light 21 impinging upon the spatial light modulator 3 is modulated and reflected from the spatial light modulator 3. The reading light 21 again impinges upon the PBS 6 as recording light 22 and passes through the PBS 6. The recording light 22 then passes through the projecting lens 8 and impinges upon the color photosensitive material 9. The color photosensitive material 9 is thus exposed to the recording light 22, and the B image is thereby recorded on the color photosensitive material 9.

Thereafter, an image signal Q carrying a G optical pattern is fed into the CRT display device 2. In the same manner as that described above for the B optical pattern, the G optical pattern is written into the spatial light modulator 3. After the G optical pattern has been written into the spatial light modulator 3, the filter 5 is changed over to G, and the G optical pattern is read from the spatial light modulator 3 with the G reading light 21 and recorded on the color photosensitive material 9.

Thereafter, an image signal Q carrying an R optical pattern is fed into the CRT display device 2. In the same manner as that described above for the B and G optical patterns, the R optical pattern is written into the spatial light modulator 3. After the R optical pattern has been written into the spatial light modulator 3, the filter 5 is changed over to R, and the R optical pattern is read from the spatial light modulator 3 with the R reading light 21 and recorded on the color photosensitive material 9.

In the manner described above, the B, G, and R image signals Q are successively fed into the CRT display device 2. Also, the respective optical patterns, which have been successively written into the spatial light modulator 3, are read respectively with the B reading light 21, the G reading light 21, and the R reading light 21 and recorded on the color photosensitive material 9. A color image (photographic latent image) is thereby recorded on the color photosensitive material 9.

Figure 4A:
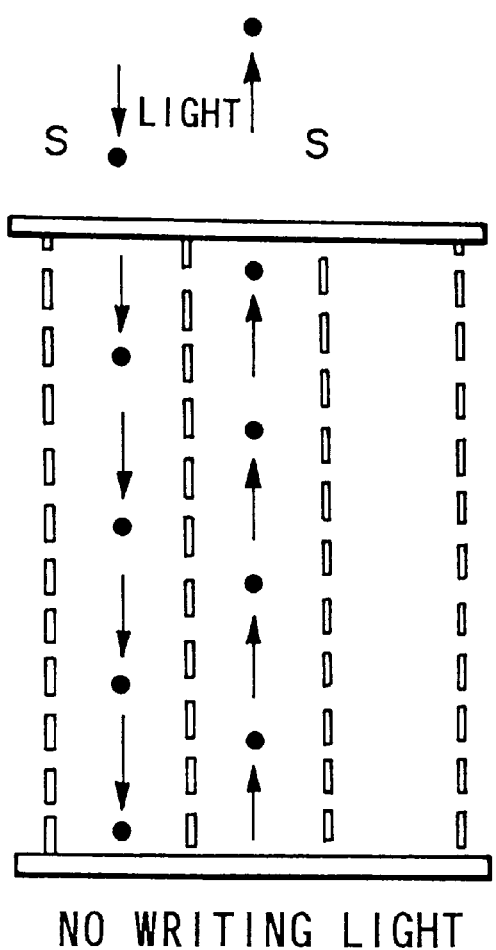
FIGS. 4A and 4B are explanatory views showing the relationship between the directions of the major axes of liquid crystal molecules and the light modulation characteristics.
Figure 4B:
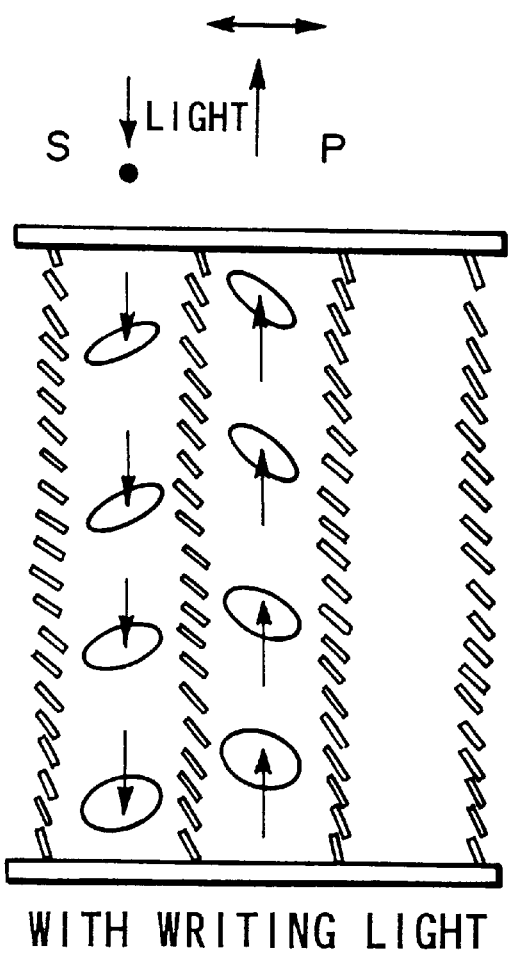

How the optical pattern is read from the spatial light modulator 3 will hereinbelow be described in more detail. FIG. 3 and FIGS. 4A, 4B are explanatory views showing how the optical pattern is read from the spatial light modulator 3. As illustrated in FIG. 3, the reading light 21 produced by the halogen lamp 4 is the natural light having no polarization. The reading light 21 is separated by the PBS 6 into two kinds of linearly polarized light, i.e., the P-polarized wave (i.e., the light whose electric vector is parallel to the plane of the sheet of FIG. 3) and the S-polarized wave (i.e., the light whose electric vector is normal to the plane of the sheet of FIG. 3). The P-polarized wave passes through the PBS 6, and only the S-polarized wave is reflected by the film surface of the PBS 6 and travels toward the spatial light modulator 3.

FIGS. 4A and 4B show the relationship between the directions of the major axes of vertical-orientation liquid crystal molecules in the liquid crystal layer 11 of the spatial light modulator 3 and the light modulation characteristics. FIG. 4A shows the state in which no optical pattern has been written into the photoconductive layer 10. FIG. 4B shows the state in which an optical pattern has been written into the photoconductive layer 10.

As illustrated in FIG. 4A, in cases where no optical pattern has been written into the photoconductive layer 10 and the impedance of the photoconductive layer 10 is high, in the state in which the AC bias voltage is being applied by the electric power source 42, the voltage across the liquid crystal layer 11 is lower than a predetermined threshold value. In this state, the major axes of the liquid crystal molecules and the optical axis of the passing light coincide with each other, and no birefringence effect is obtained. Therefore, the light incident as the S-polarized wave follows the path via the liquid crystal layer 11, the dielectric mirror 12, and the liquid crystal layer 11, and is thereafter radiated out as the S-polarized wave from the spatial light modulator 3. Thereafter, the light follows the same path as that of the incident light shown in FIG. 3 and returns to the light source. Accordingly, no recording light travels toward the color photosensitive material 9. Such a non-modulating state with the vertical orientation of the liquid crystal molecules is free from dependency upon wavelengths, and therefore a high contrast ratio can be obtained.

As illustrated in FIG. 4B, in cases where an optical pattern has been written into the photoconductive layer 10 and the impedance of the photoconductive layer 10 is low, in the state in which the AC bias voltage is being applied by the electric power source 42, a voltage of several volts is applied across the liquid crystal layer 11. In this state, the liquid crystal molecules incline in the direction that intersects perpendicularly to the electric field produced by the applied voltage. The major axes of the liquid crystal molecules and the optical axis of the passing light thus intersect each other, and the birefringence effects are obtained. Therefore, while the light incident as the S-polarized wave is traveling through the liquid crystal layer 11, the form of polarization of the light is modulated and, as shown in FIG. 4B, the light is converted into elliptically polarized light or circularly polarized light. Thereafter, the light is radiated out from the spatial light modulator 3.

The degree of modulation of the reading light 21 varies in accordance with the optical pattern, which has been written into the spatial light modulator 3. When the degree of modulation is highest, the reading light 21 is modulated into the P-polarized wave. The thus modulated reading light 21 impinges upon the PBS 6, passes through the PBS 6, and impinges as the recording light 22 upon the color photosensitive material 9. In this manner, the reading light 21 is modulated in accordance with the optical pattern, which has been written into the spatial light modulator 3, and the modulated reading light 21 is irradiated to the color photosensitive material 9.

In the manner described above, the color image is recorded on the color photosensitive material 9. The color photosensitive material 9, on which the color image has been recorded, is fed into a developing machine (not shown) and subjected to development processing. The color image is thereby reproduced as a visible image.

Figure 9:
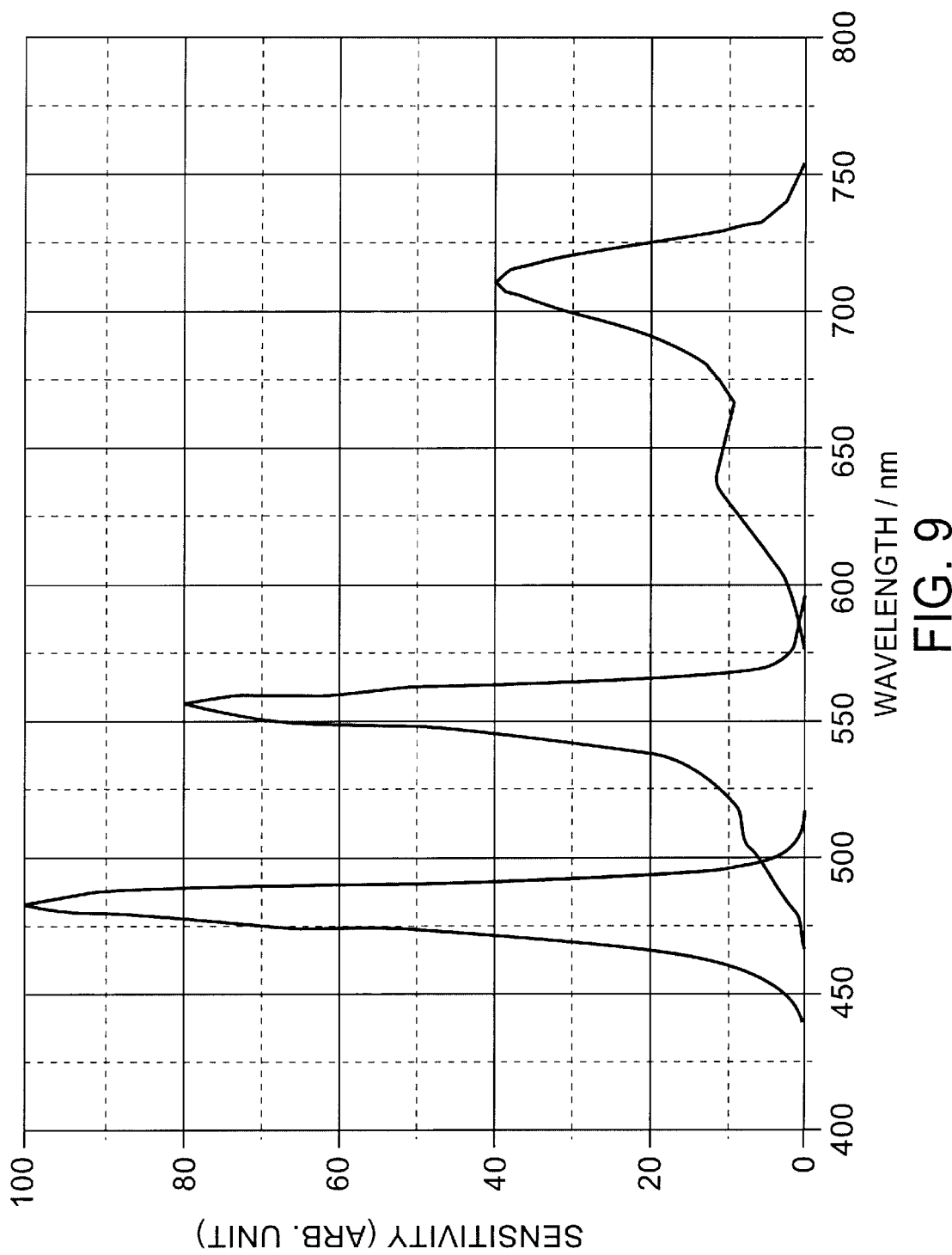
FIG. 9 is a graph showing the spectral sensitivity of a typical photosensitive material.
Figure 10:
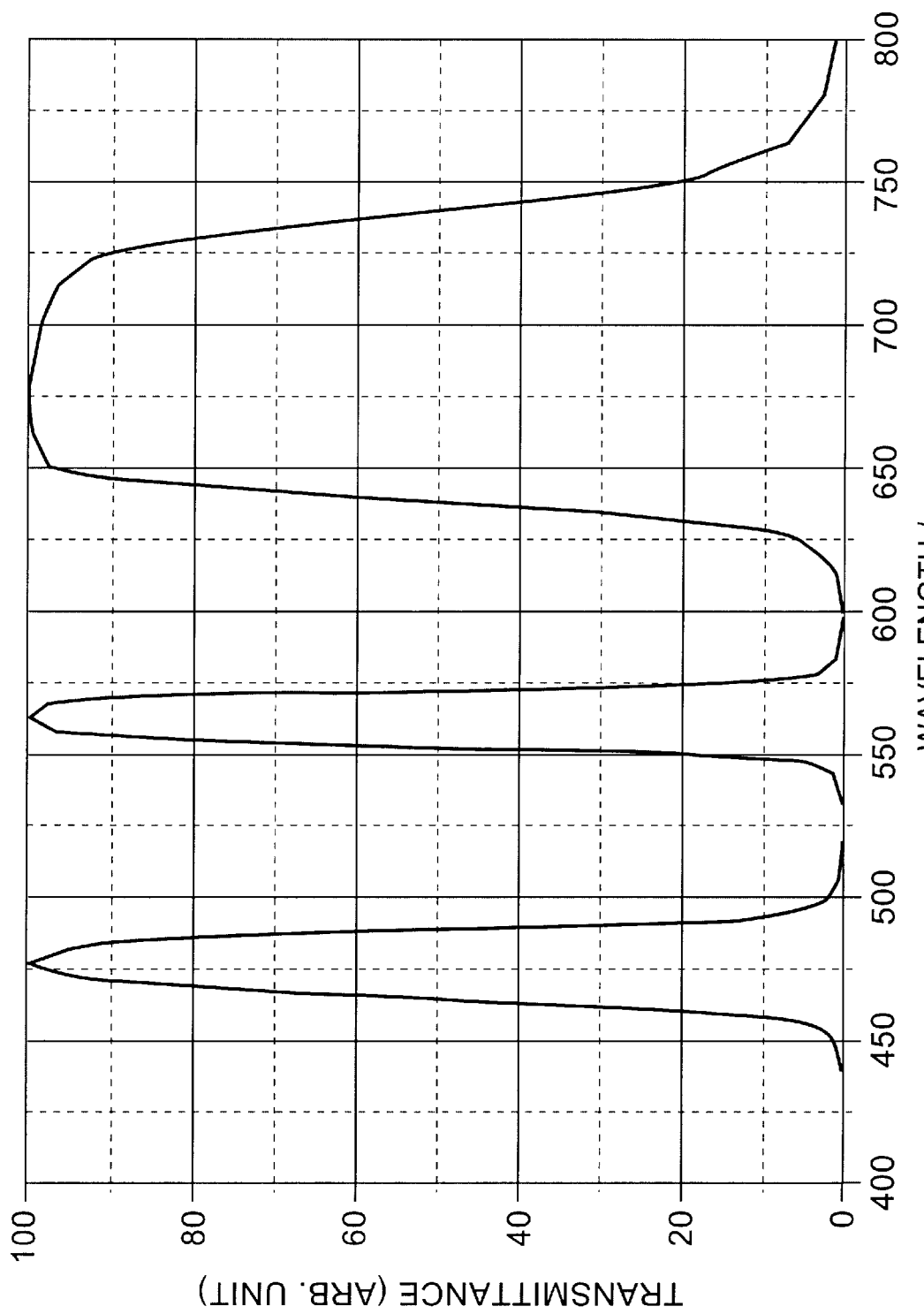
FIG. 10 is a graph showing the transmittance of typical color filters, the wavelengths of which are determined in order to eliminate interface among exposure colors.

An example of the spectral sensitivity of a typical photosensitive material 9 is shown in FIG. 9. As in ordinary color photosensitive materials, the ratio among the sensitivities SB, SG, and SR of the color photosensitive material 9 with respect to the B reading light, the G reading light, and the R reading light is approximately 100:20:1, after multiplying the spectral sensitivity of the photosensitive material 9, shown in FIG. 9, by the transmittance of filter 5, shown in FIG. 10. Also, as described above, the ratio among the reflectances of the dielectric mirror 12 with respect to the B reading light, the G reading light, and the R reading light is set to be approximately 18:54:100. As a result, with the synergistic effects with the emission spectrum of the halogen lamp 4, and the like, the spectral sensitivity characteristics of the color photosensitive material 9 can be compensated for.

Figure 6:
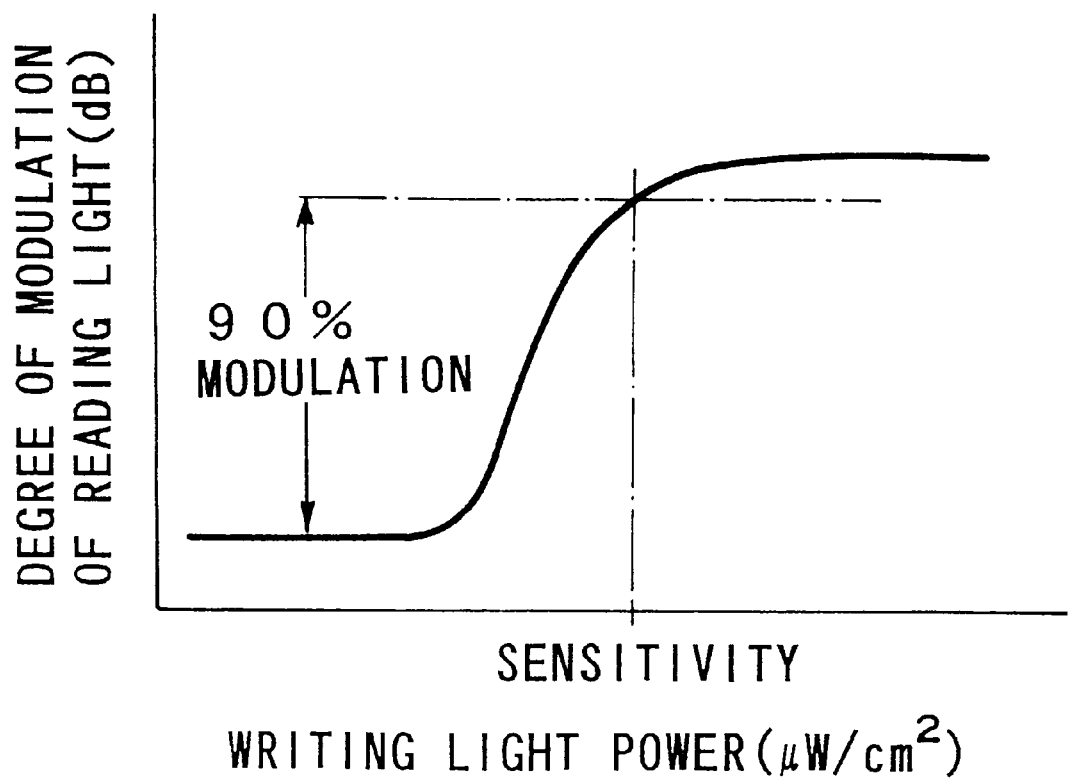
FIG. 6 is an explanatory graph showing the sensitivity of an image recording apparatus.

Evaluation using a USAF chart revealed that the resolution of the color image reproduced on the color photosensitive material 9 was 40 (lp/mm). Also, as illustrated in FIG. 6, the response of the degree of modulation of the reading light with respect to the writing light power was investigated, and the sensitivity was defined in terms of the writing light power, at which the degree of modulation reaches the saturation value of 90%. In this embodiment, the thus defined sensitivity was 10 ($\mu$W/cm$^2$).

<Comparative example>

In a comparative example, an image recording apparatus was formed, which had the same constitution as that in the aforesaid embodiment, except for the dielectric mirror 12. With the image recording apparatus, a color image was recorded on the color photosensitive material 9 in the same manner as that in the aforesaid embodiment. In the comparative example, a dielectric mirror employed in lieu of the dielectric mirror 12 had the characteristics such that the mean reflectances RB, RG, and RR with respect to the B reading light, the G reading light, and the R reading light, which are of the same types as those described above, may be approximately 90%. Also, the dielectric mirror employed in the comparative example had flat spectral reflectance characteristics with respect to the B reading light, the G reading light, and the R reading light.

Figure 7:
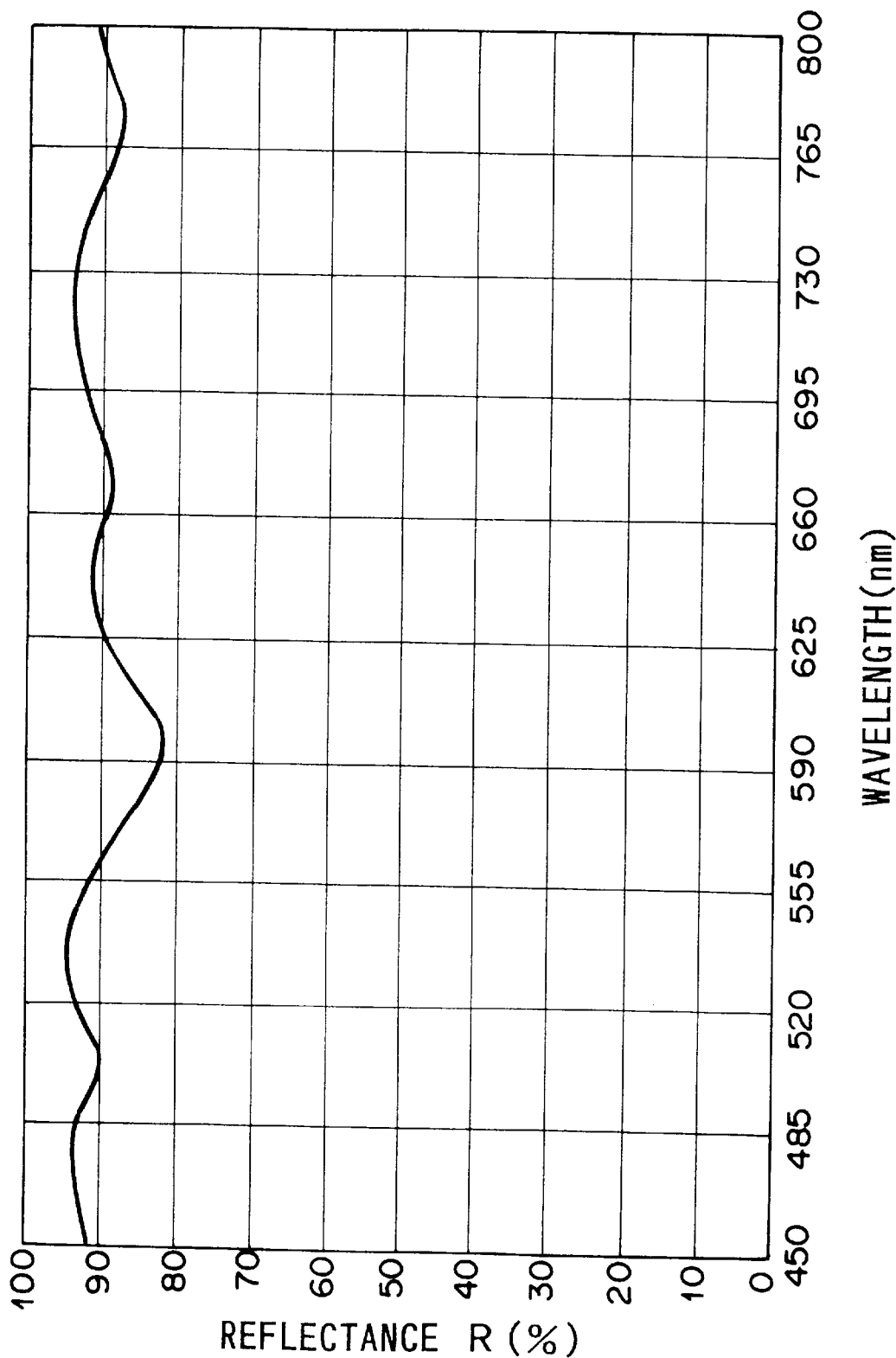
FIG. 7 is a graph showing the spectral reflectance characteristics of a dielectric mirror in a spatial light modulator in a comparative example.

The dielectric mirror employed in the comparative example was composed of the TiO$_2$ films and the SiO$_2$ films, which were formed with the vacuum evaporation process as in the aforesaid embodiment. The dielectric mirror was obtained by successively forming nine quarter-wave alternate multi-layer films with respect to each of center wavelengths of 430 nm, 560 nm, 690 nm, and 830 nm and SiO$_2$ intermediate layers, and thereby forming a total of 39 layers. The total thickness of the dielectric mirror was 3.5 $\mu$m. FIG. 7 shows the spectral reflectance characteristics of the dielectric mirror.

By use of the image recording apparatus of the comparative example, a color image was recorded on the color photosensitive material 9, which was of the same type as that in the aforesaid embodiment. Evaluation was made with respect to the resolution of the color image and the sensitivity of the apparatus in the same manner as that in the aforesaid embodiment. It was found that the resolution was 35 (lp/mm) and the sensitivity was 15 ($\mu$W/cm$^2$).

As described above, it was confirmed that, with the embodiment of the image recording apparatus in accordance with the present invention, wherein the dielectric mirror 12 having a total thickness of 1.2 $\mu$m (approximately ⅓ of the thickness of the dielectric mirror in the comparative example) is employed, the resolution and the sensitivity can be kept higher than in the comparative example.

What is claimed is:

1. An image recording apparatus comprising:
   i) a single spatial light modulator, comprising:
      a) a photoconductive layer;
      b) an electro-optic material layer; and
      c) a multi-layer film mirror disposed between said photoconductive layer and said electro-optic material layer;
      wherein the multi-layer film mirror has electrical insulating properties, wherein an optical pattern is written into the single spatial light modulator by optically inputting the optical pattern into the single spatial light modulator from the side of the photoconductive layer, and wherein the optical pattern, written into the single spatial light modulator, may be read from the single spatial light modulator by irradiating reading light from the side of the electro-optical material to the single spatial light modulator and reflecting the reading light by the multi-layer film mirror;
   ii) an optical pattern input apparatus, which inputs blue (B), green (G), and red (R) optical patterns into the single spatial light modulator; and
   iii) an optical pattern reading apparatus comprising:
      a) a light source for irradiating B reading light, G reading light, and R reading light to the single spatial light modulator in synchronization with the inputting of the B, G, and R optical patterns, respectively; and
      b) an optical system for irradiating the B, G. and R optical patterns, which have been read from the single spatial light modulator, to a color photosensitive material;
   wherein the image recording apparatus records a color image, which is represented by the B, G, and R optical patterns, on the color photosensitive material;
   wherein the multi-layer film mirror has spectral reflectance characteristics such that a first reflectance with respect to the reading light having wavelengths falling within a first wavelength range, for which a sensitivity of the color photosensitive material is high, is lower than a second reflectance with respect to the reading light having wavelengths falling within a second wavelength range, for which the sensitivity of the color photosensitive material is low, wherein the multi-layer film mirror has an effective reflectance range capable of substantially covering an entire range of visible wavelength light, and wherein said effective reflectance range is substantially uniform across an entire area of said multi-layer film mirror.

2. An apparatus as defined in claim 1 wherein the color photosensitive material has the characteristics such that the sensitivity SB with respect to the B reading light, the sensitivity SG with respect to the G reading light, and the sensitivity SR with respect to the R reading light have a relationship represented by the formula SB>SG>SR, and
   wherein the multi-layer film mirror has the characteristics such that the reflectance RB with respect to the B reading light, the reflectance RG with respect to the G reading light, and the reflectance RR with respect to the R reading light have a relationship represented by the formula RB<RG<RR.

3. An apparatus as defined in claim 2 wherein the B reading light irradiated from the light source has wavelengths falling within a wavelength range of 460 nm to 500 nm, the G reading light irradiated from the light source has wavelengths falling within a wavelength range of 540 nm to 580 nm, and the R reading light irradiated from the light source has wavelengths falling within a wavelength range of 630 nm to 750 nm, and
   wherein a red mean value of the reflectance RR with respect to the R reading light is taken as 100, a blue mean value of the reflectance RB with respect to the B reading light falls within the range of 5≦RB<30, and a green mean value of the reflectance RG with respect to the G reading light falls within the range of 30≦RB≦70.

4. An apparatus as defined in claim 1 wherein the multi-layer film mirror is made from a multi-layer film selected from a group consisting of a first multi-layer film constituted of a single dielectric substance having electrical insulating properties, and a second multi-layer film constituted of a plurality of dielectric substances having electrical insulating properties.

5. An apparatus as defined in claim 4 wherein the second multi-layer film is constituted of a material selected from a group consisting of silicon oxide, titanium oxide, hafnium oxide, tantalum oxide, magnesium fluoride, lithium fluoride, zinc sulfide, a mixture of at least two of the above-enumerated compounds, a combination of at least two of the above-enumerated compounds, a combination of at least two of the mixtures, and a combination of at least one of the above-enumerated compounds and at least one of the mixtures.

6. An apparatus as defined in claim 1 wherein the thickness of the multi-layer film mirror is at most 3 μm.

7. An apparatus as defined in claim 4 wherein the first multi-layer film is constituted of a material selected from a group consisting of silicon oxide, titanium oxide, hafnium oxide, tantalum oxide, magnesium fluoride, lithium fluoride, zinc sulfide, and a mixture of at least two of the above-enumerated compounds.

8. An apparatus as defined in claim 1 wherein the single spatial light modulator further comprises:

orientation films located on both sides of the electro-optical material layer;

a light absorbing layer, for blocking the reading light, located between the photoconductive layer and the multi-layer film mirror;

a first transparent electrode located on an outward side of the photoconductive layer;

a second transparent electrode located on an outward side of one of the orientation films which is located on the side of the electro-optical material layer which faces away from the photoconductive layer;

glass substrates which form outer layers of the single spatial light modulator; and a n electric power source connected to the first and second transparent electrodes, for applying an AC bias voltage across the photoconductive layer and the electro-optical material layer.

9. An apparatus as defined in claim 1 wherein the electro-optical material layer is a liquid crystal material having a negative dielectric anisotropy.

* * * * *